US011593052B1

(12) United States Patent
Michna et al.

(10) Patent No.: US 11,593,052 B1
(45) Date of Patent: Feb. 28, 2023

(54) KEYBOARD/VIDEO/MONITOR SWITCH FOR SERVERS WITHOUT INTEGRATED VIDEO CONTROLLER

(71) Applicant: Hewlett Packard Enterprise Development LP, Houston, TX (US)

(72) Inventors: Vincent W. Michna, Houston, TX (US); Peter Alexander Hansen, Cypress, TX (US); Quoc Hung C. Vu, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/855,238

(22) Filed: Jun. 30, 2022

(51) Int. Cl.
| G06F 3/14 | (2006.01) |
| G06F 3/0489 | (2022.01) |
| G06F 3/0354 | (2013.01) |
| G06F 3/0482 | (2013.01) |
| G06F 13/42 | (2006.01) |
| G06F 13/38 | (2006.01) |
| G06F 3/023 | (2006.01) |

(52) U.S. Cl.
CPC ............... *G06F 3/14* (2013.01); *G06F 3/023* (2013.01); *G06F 3/03543* (2013.01); *G06F 3/0482* (2013.01); *G06F 3/04897* (2013.01); *G06F 13/382* (2013.01); *G06F 13/4282* (2013.01); *G06F 2213/0042* (2013.01)

(58) Field of Classification Search
CPC ........ G06F 3/14; G06F 3/023; G06F 3/03543; G06F 3/0482; G06F 3/04897; G06F 13/382; G06F 13/4282; G06F 2213/0042
See application file for complete search history.

(56) References Cited

U.S. PATENT DOCUMENTS

| 7,917,674 | B2 | 3/2011 | Lin et al. | |
| 7,921,230 | B2 | 4/2011 | Harvey et al. | |
| 8,255,576 | B2 | 8/2012 | Siulinski et al. | |
| 8,266,363 | B2 * | 9/2012 | Chou | G06F 3/023 710/316 |
| 9,817,459 | B2 | 11/2017 | Gonzales et al. | |
| 2006/0230110 | A1 * | 10/2006 | VanHarlingen | H04L 67/125 709/205 |
| 2008/0201501 | A1 * | 8/2008 | Partani | H04L 41/34 710/63 |
| 2009/0031049 | A1 * | 1/2009 | Lien | G06F 3/038 710/6 |

(Continued)

*Primary Examiner* — Amit Chatly
(74) *Attorney, Agent, or Firm* — Yao Legal Services, Inc.

(57) ABSTRACT

An apparatus comprises a switch and nodes coupled to the switch. Each node does not include an integrated video controller and transmits data to the switch via a USB and a serial connection. The switch comprises a controller which stores video output generated based on data received via serial connections. The controller: receives a user selection for a first node; transmits the user selection to a first multiplexer; retrieves a first video output generated based on data received via the corresponding serial connection; and transmits the first video output to a second multiplexer. The first multiplexer transmits USB data received from the first node to the second multiplexer. If the first node is in a pre-boot environment, the second multiplexer selects the first video output for transmission. If the first node is in a post-boot environment, the second multiplexer selects the data received from the first node for transmission.

20 Claims, 8 Drawing Sheets

(56) References Cited

U.S. PATENT DOCUMENTS

| | | | |
|---|---|---|---|
| 2009/0077222 A1* | 3/2009 | Shen | G06F 3/023 710/36 |
| 2011/0161533 A1* | 6/2011 | Lin | G06F 3/0227 710/72 |
| 2015/0356045 A1* | 12/2015 | Soffer | G06F 3/023 710/303 |
| 2021/0374084 A1* | 12/2021 | Liang | G06F 13/4022 |

* cited by examiner

```
<Server Make and Model>
System ROM Version: <Value 1> <Date>
Serial Number: <Value 2>
```
402 → `Node Number: <Value 3 = "Node 3">`
```
Installed System Memory: 32 GB, Available System Memory: 32 GB 2 Processor(s) detected, 128 cores enabled, SMT is enabled
Proc 1: <Processor Model 64-Core Processor>
Proc 2: <Processor Model 64-Core Processor>
Interconnect Speed: 16.0 GT/s Workload Profile: <Value 4>
Power Regulator Mode: <Value 5>
Advanced Memory Protection Mode: <Value 6>
RAS Mode: <Value 7>
Boot Mode: <Value 8>
```
404 →
```
<Event No.> <Event Desc. = "iLO Debug Certificate Detected">
Action: <Desc. = "Remove Debug Certificate from iLO">

For access via BIOS Serial Console:
Press 'ESC+9' for System Utilities
Press 'ESC+0' for Intelligent Provisioning
Press 'ESC+!' for One-Time Boot Menu
Press 'ESC+@' for Network Boot Starting required devices. Please wait, this may take a few moments....

iLO has detected a self-test error. For details, consult <Server and Diagnostics page>.
```

FIG. 4A

```
Action: <Desc. = "Remove Debug Certificate from iLO">

For access via BIOS Serial Console:
Press 'ESC+9' for System Utilities
Press 'ESC+0' for Intelligent Provisioning
Press 'ESC+!' for One-Time Boot Menu
Press 'ESC+@' for Network Boot Starting required devices. Please wait, this may take a few moments....

iLO has detected a self-test error. For details, consult <Server and Diagnostics page>.
```

FIG. 4B

```
<Server Make and Model>
System ROM Version: <Value 1> <Date>
Serial Number: <Value 2>
Node Number: <Value 3>

Installed System Memory: 32 GB, Available System Memory: 32 GB

2 Processor(s) detected, 128 cores enabled, SMT is enabled
Proc 1: <Processor Model 64-Core Processor>
Proc 2: <Processor Model 64-Core Processor>
Interconnect Speed: 16.0 GT/s Workload Profile: <Value 4>
Power Regulator Mode: <Value 5>
Advanced Memory Protection Mode: <Value 6>
RAS Mode: <Value 7>
Boot Mode: <Value 8>

<Event No.> <Event Desc. = "iLO Debug Certificate Detected">
Action: <Desc. = "Remove Debug Certificate from iLO">

For access via BIOS Serial Console:
Press 'ESC+9' for System Utilities
Press 'ESC+0' for Intelligent Provisioning
Press 'ESC+!' for One-Time Boot Menu
Press 'ESC+@' for Network Boot Starting required devices. Please wait, this may take a few moments….

iLO has detected a self-test error. For details, consult <Server and Diagnostics page>.
```

FIG. 4C

```
<Server Make and Model>
System ROM Version: <Value 1> <Date>
Serial Number: <Value 2>
Node Number: <Value 3>

Installed System Memory: 32 GB, Available System Memory: 32 GB

2 Processor(s) detected, 128 cores enabled, SMT is enabled
Proc 1: <Processor Model 64-Core Processor>
Proc 2: <Processor Model 64-Core Processor>
Interconnect Speed: 16.0 GT/s Workload Profile: <Value 4>
Power Regulator Mode: <Value 5>
Advanced Memory Protection Mode: <Value 6>
RAS Mode: <Value 7>
Boot Mode: <Value 8>

<Event No.> <Event Desc. = "iLO Debug Certificate Detected">
Action: <Desc. = "Remove Debug Certificate from iLO">

For access via BIOS Serial Console:
Press 'ESC+9' for System Utilities
Press 'ESC+0' for Intelligent Provisioning
Press 'ESC+!' for One-Time Boot Menu
Press 'ESC+@' for Network Boot Starting required devices. Please wait, this may take a few moments….

iLO has detected a self-test error. For details, consult <Server and Diagnostics page>.
```

FIG. 4D

KEYBOARD/VIDEO/MONITOR SWITCH FOR SERVERS WITHOUT INTEGRATED VIDEO CONTROLLER

BACKGROUND

Field

Physical space is a valuable and limited resource in data centers. Current data centers may include servers in a high-density configuration, e.g., blade severs with a form factor which may be smaller than that of a traditional server. An integrated video controller on each server may provide video functionality for each server. Many of these servers may not require frequent, if any, video functionality via keyboard/monitor/video (KVM) access. As a result, current data servers may include "headless" servers, i.e., servers without integrated video controllers. However, in some instances, it may be beneficial to provide a unified design for slightly less dense servers which require a minimal non-zero amount of KVM functionality. For example, KVM functionality may be needed if a server cannot be remotely accessed via a network or if direct console access is required for other reasons. In addition, direct console access may be the only way to access a server that is in the pre-boot environment.

BRIEF DESCRIPTION OF THE FIGURES

FIG. 4A illustrates a sample screen displaying contents during a pre-boot environment, as a desired screen output, in accordance with an aspect of the present application.

FIG. 4B illustrates a sample screen of pre-boot environment contents without text-based serial port frame buffering, corresponding to the sample screen of FIG. 4A, in accordance with an aspect of the present application.

FIG. 4C illustrates a sample screen displaying contents during a pre-boot environment, as a desired screen output, similar to the sample screen of FIG. 4A, in accordance with an aspect of the present application.

FIG. 4D illustrates a sample screen of pre-boot environment contents with text-based serial port frame buffering, corresponding to the sample screen of FIG. 4C, in accordance with an aspect of the present application.

In the figures, like reference numerals refer to the same figure elements.

DETAILED DESCRIPTION

Figure 1:
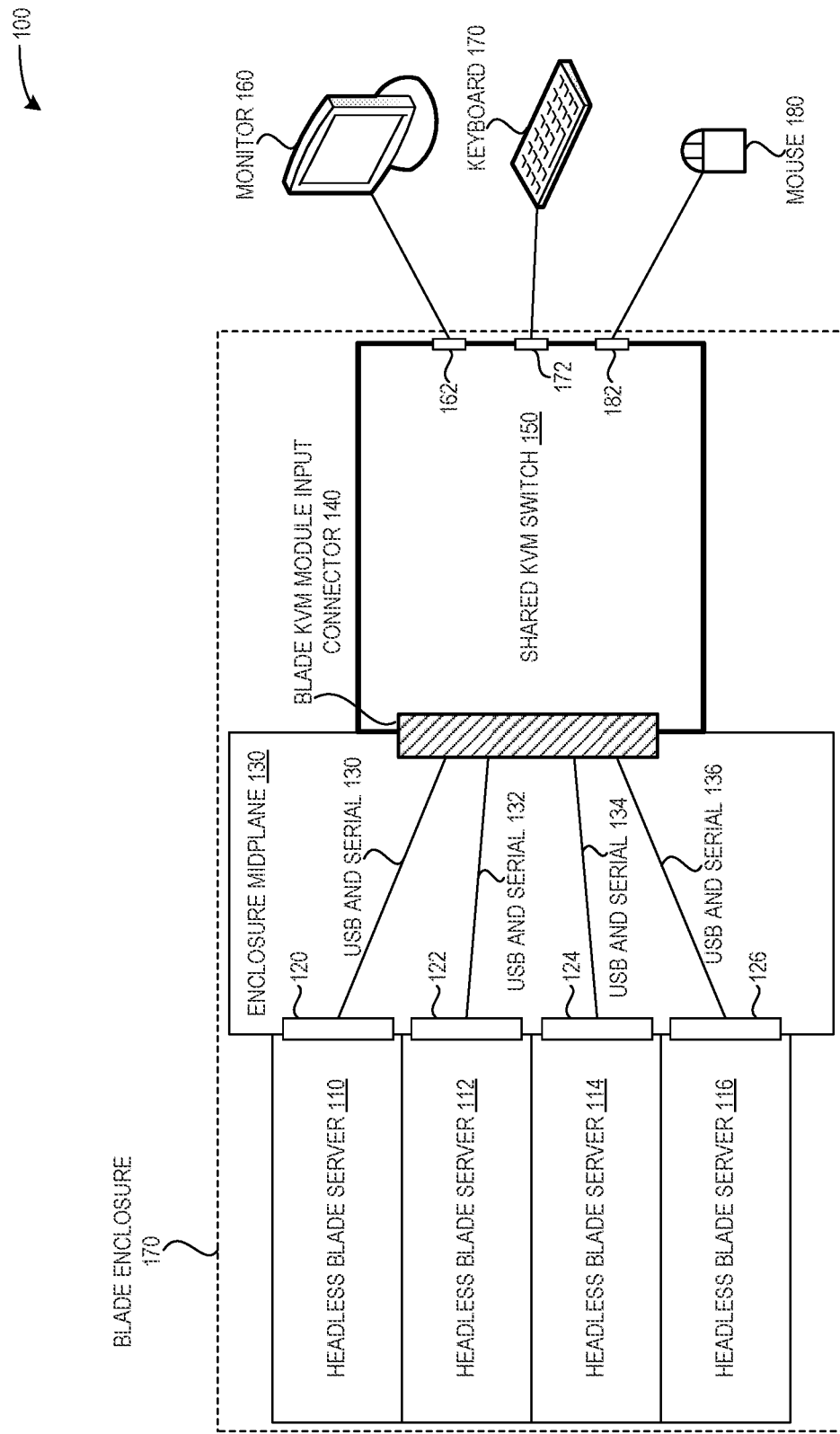
FIG. 1 illustrates a high-level diagram of a shared KVM switch for multiple blade servers without integrated video controllers, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Physical space is a valuable and limited resource in data centers. Current data centers may include servers in a high-density configuration, e.g., blade servers with a form factor which may be smaller than that of a traditional server. An integrated video controller on each server may provide video functionality for each server. Many of these servers may not require frequent, if any, video functionality via keyboard/monitor/video (KVM) access. As a result, current data servers may include "headless" servers or nodes, i.e., servers, nodes, or computing entities without integrated video controllers. However, in some instances, it may be beneficial to provide a unified design for slightly less dense servers which require a minimal non-zero amount of KVM functionality. For example, KVM functionality may be needed if a server cannot be remotely accessed via a network or if direct console access is required for other reasons. In addition, direct console access may be the only way to access a server that is in the pre-boot environment.

Aspects of the instant application provide a KVM switch which can be coupled to, associated with, and shared by multiple headless servers, where each server does not include an embedded or integrated video controller. Each server can transmit data to the shared KVM switch via a USB connection and a serial connection, and the shared KVM switch can include a video output port and at least two external USB ports (e.g., keyboard USB and mouse USB signals). The KVM switch can reside in a same or a different enclosure as the servers. The described aspects allow all servers coupled to or associated with the KVM switch to share a single monitor, keyboard, and mouse, even though the headless servers do not provide any graphics outputs. A high-level diagram of a shared KVM switch for headless blade servers is described below in relation to FIG. 1. In this disclosure, the description of blade servers as the type of servers for which the KVM switch provides the described functionality is merely illustrative. That is, blade servers are used only as one non-limiting example of servers. Any type of headless server (i.e., without an integrated video controller) may be coupled to and associated with the shared KVM switch in the manner described herein. Furthermore, the term "node" is used in this disclosure to refer to a server or, by way of example, a blade server.

The switch can include a microcontroller which receives a user selection (via, e.g., a keyboard coupled to a USB port) for a first node of a plurality of nodes coupled to the switch. Each node may not include an integrated video controller and may transmit data to the switch via a USB connection and a serial connection. The microcontroller can transmit the user selection to a first multiplexer of the switch. The microcontroller can include a plurality of serial text buffers, wherein each buffer can correspond to a serial output received from each of the nodes coupled to or associated with the shared KVM switch. That is, each buffer can store the serial output received from a respective node. Based on the user selection indicating the first node, the microcontroller can determine a buffer of the microcontroller, wherein the buffer is associated with the first node. The microcontroller can also retrieve, based on the buffer, a first video output generated based on data received via the corresponding serial connection to the first node. The serial text buffers are described below in relation to FIG. 3. The microcontroller can transmit the first video output to a second multiplexer of the switch. The first multiplexer can transmit data received from the first node via the corresponding USB connection to the second multiplexer. In response to receiving data indicative of a state of the node or an environment associated with the node, the microcontroller may determine a selection to output via a video output port of the switch. Responsive to the first node being in a pre-boot environment, the microcontroller can transmit to the second multiplexer a first selection indicating the first video output, which is to be transmitted as final video output via a video output port of the switch. Responsive to the first node being in a post-boot environment, the microcontroller can transmit to the second multiplexer a second selection indicating the data received from the first node via the corresponding USB connection, which is to be transmitted as the final video output via the video output port. A shared KVM switch including a microcontroller is described below in relation to FIG. 2. A detailed diagram of the microcontroller of the shared KVM switch is described below in relation to FIG. 3. A method of facilitating the shared KVM switch for multiple blade servers without integrated video controllers is described below in relation to FIGS. 5A and 5B.

Thus, by coupling multiple servers without integrated video controllers to a shared KVM switch via USB and serial connections, and by using a microcontroller and other components of the shared KVM switch with a video output port and external USB ports to process the incoming USB and serial data, the described aspects can provide shared KVM functionality to a collection of separate servers, e.g., which are mounted together in a same rack, including the more densely populated, smaller form factor blade servers in a data center. This can result in more efficiently utilizing the valuable limited physical space in the data center. For example, disclosed systems and methods reduce the size and cost of servers because the servers may be provided KVM functionality through the KVM switch and therefore do not need to include the hardware associated with these functions.

The term "blade server" is used in this disclosure to refer to a computing device with a form factor which is generally smaller or more compact than a traditional rack server. The term "headless blade server" is used in this disclosure to refer to a blade server which does not include an integrated or embedded video controller, e.g., that does not include KVM functionality.

The term "KVM" refers to a keyboard, video, and monitor. The term "KVM switch" refers to a hardware device which allows a user to control multiple computing devices from one or more sets of KVMs. The term "shared KVM switch" is used in this disclosure to refer to a KVM switch which is shared by multiple headless servers.

The term "pre-boot environment" is used in this disclosure to refer to the period of time during which a system is powered on, but the operating system (OS) and OS video drivers have not yet loaded. The pre-boot environment may include a power-on self test (POST), a read-only memory (ROM)-based setup utility menu, Add-in option card menus, baseboard management controller (BMC) menus, etc. In this disclosure, the pre-boot environment can also include operating system (OS) loads which are only text-based (i.e., an OS with no corresponding graphical user interface (GUI)). While in the pre-boot environment, the KVM switch of the described aspects can generate video output for a selected server based on the text contents received via a serial port of the selected server. Determining whether a blade server is in the pre-boot environment and receiving text-based data via serial connections is described below in relation to FIGS. 1-3.

The term "post-boot environment" is used in this disclosure to refer to period of time during which a system has booted to the OS and completed loading a USB-based video controller driver. While in the post-boot environment, the KVM switch of the described aspects can generate video output from a selected blade using a USB video controller. A USB video controller can reside in the shared KVM switch and is described below in relation to FIG. 2.

The terms "serial text buffer" and "text-based serial frame buffer" are used interchangeably in this disclosure and refer to one or more memory locations inside a microcontroller of the switch, wherein a serial text buffer stores the most recent serial text output from each headless server coupled to or associated with the shared KVM switch. The microcontroller can generate a complete video screen output based on the contents of a serial text buffer associated with a selected server. Serial text buffers of a microcontroller of a shared KVM switch are described below in relation to FIG. 3, and sample screens with and without text-based serial port frame buffering are described below in relation to FIGS. 4A-D.

The term "video output multiplexer" or "video output MUX" is used in this disclosure to refer to a multiplexer which selects the video output of either a USB video controller or a microcontroller. The selection of the video output MUX is determined based on whether a selected server is in a pre-boot environment (in which case the video output MUX selects the video output from the microcontroller) or in a post-boot environment (in which case the video output MUX selects the video output from the USB video controller). A video output MUX and its selection of a particular video output are described below in relation to FIGS. 2 and 3.

The term "USB multiplexer" or "USB MUX" is used in this disclosure to refer to a simple multiplexer which connects to a USB hub (within the shared KVM switch) to the USB port of the USB port of a user-selected server.

High-Level Diagram of a Shared KVM Switch for Headless Blade Servers

Aspects of the instant application can include a switch with a plurality of servers, e.g., blade servers, coupled to the switch. Each blade server can transmit data to the KVM switch via a USB connection and a serial connection. Similarly, the KVM switch can use a single USB port interface and a dedicated serial port interface to each blade server, as depicted below in relation to FIG. 1. The KVM switch can also include a video output port and at least two external USB ports. A user can provide a user selection of one of the plurality of blade servers coupled to the KVM switch, e.g., using a keyboard coupled to one of the external USB ports. If the selected blade server is in the pre-boot environment, the KVM switch can drive first video output generated based on text contexts received from the corresponding serial port for the selected blade server to the video output port. If the selected blade server is in the post-boot environment, the KVM switch can drive video output of the USB video controller to the video output port. Determining whether a blade server is in the pre-boot or post-boot environment is described below in relation to FIGS. 2 and 3.

FIG. 1 illustrates a high-level diagram 100 of a shared KVM switch for multiple blade servers without integrated video controllers, in accordance with an aspect of the present application. Diagram 100 can include: multiple headless blade servers 110, 112, 114, and 116; an enclosure midplane 130 comprised of traces and connectors; a shared KVM switch 150; and peripheral input/output (I/O) KVM devices (e.g., a monitor 160, a keyboard 170, and a mouse or other pointing device 180). Each headless blade server can include a connector comprising a USB port and a serial port connected or coupled to a blade KVM module input connector 140 of shared KVM switch 150. For example, headless blade server 110 can include a connector 120 which transmits USB and serial data 130 to blade KVM module input connector 140. Similarly: headless blade server 112 can include a connector 122 which transmits USB and serial data 132 to blade KVM module input connector 140; headless blade server 114 can include a connector 124 which transmits USB and serial data 134 to blade KVM module input connector 140; and headless blade server 116 can include a connector 126 which transmits USB and serial data 136 to blade KVM module input connector 140. While USB and serial data 130, 132, 134, and 136 are each depicted as a single line, the data can be transmitted via two separate connections, lines, or wires, e.g., one destined for a USB interface or port of blade KVM module input connector 140 and another destined for a serial interface or port of blade KVM module input connector 140.

Shared KVM switch 150 can include connectors or external ports to each of the peripheral I/O USB devices. For example: a connector or video output port 162 can be coupled to monitor 160; a USB connector 172 can be coupled to keyboard 170; and a USB connector 182 can be coupled to mouse 180.

Detailed Overview of a Shared KVM Switch for Headless Blade Servers

As described above, the KVM switch can include a video output port, e.g., a High Definition Multimedia Interface (HDMI) port, and at least two external USB ports, e.g., for a keyboard and a mouse. The KVM switch can route signals or data received via the external USB ports through a microcontroller of the KVM switch in order to enable hotkey detection. The external USB ports, along with the USB video controller, can eventually connect back to the selected blade server through a USB hub within the KVM switch. When the user selects a blade server to use with the KVM switch, the USB video/keyboard/mouse devices (coupled via the video output port and the external USB ports) on the KVM switch may appear as "hot-added" to the blade server, i.e., where the USB devices may be dynamically added to the running system (the running KVM switch) without downtime. When the user selects a different blade server to use within the KVM switch, these USB KVM devices may appear as hot-removed from the selected blade server. Hotkey detection, USB pass-through, and switching between different blade servers is described below in relation to FIGS. and 4A-D.

Figure 2:
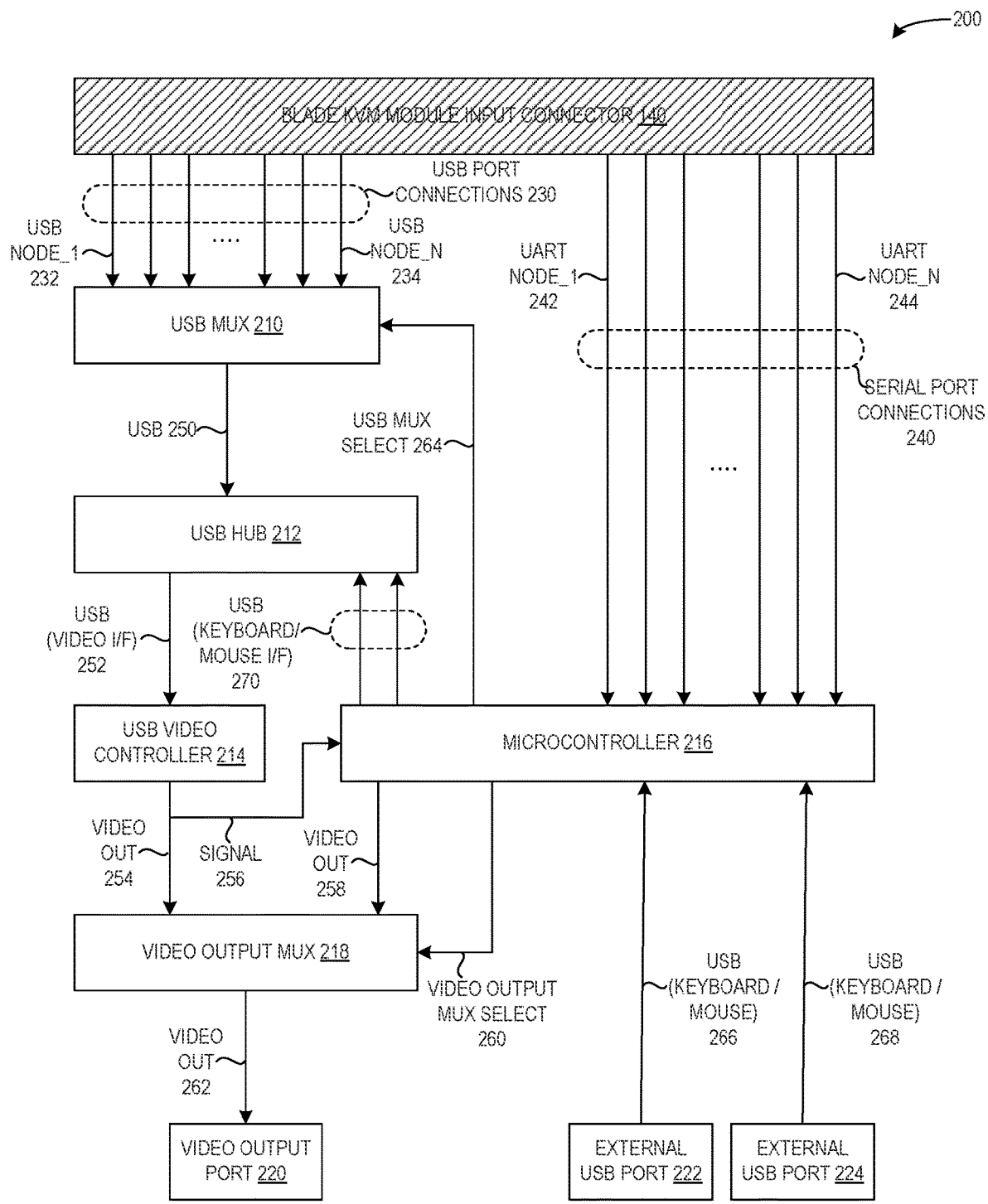
FIG. 2 illustrates a diagram of a shared KVM switch using Universal Serial Bus (USB) and serial connections for multiple blade servers without integrated video controllers, in accordance with an aspect of the present application.

FIG. 2 illustrates a diagram 200 of a shared KVM switch using USB and serial connections for multiple blade servers without integrated video controllers, in accordance with an aspect of the present application. Diagram 200 can include: blade KVM module input connector 140 (as depicted above in FIG. 1); a USB MUX 210 ("first multiplexer"); a USB hub 212; a microcontroller 216 ("first controller"); a USB video controller 214 ("second controller"); a video output MUX 218 ("second multiplexer"); a video output port 220; and external USB ports 222 and 224.

Blade KVM module input connector 140 can receive USB and serial data from multiple headless blade servers, e.g., [1 . . . N], as described above in relation to FIG. 1. Connector 140 can transmit the USB data from nodes 1 through N to USB MUX 210, as indicated by USB port connection 230 (which can include at least USB node_1 232 and USB node_N 234). Connector 140 can also transmit the serial data from nodes 1 through N to microcontroller 216, as indicated by serial port connections 240 (which can include at least universal asynchronous receiver-transmitter (UART) node_1 242 and UART node_N 244).

Microcontroller 216 can store the text-based serial data received via serial port connections 240 in respective serial text buffers. Microcontroller 216 can perform internal multiplexing of the multiple serial port connections based on a user-selected signal indicating a particular blade server. Microcontroller 216 can also convert the stored text-based serial data to video output. Microcontroller functionality relating to the serial port connections is described below in relation to FIG. 3.

During operation, a user may select a first node (e.g., a node_1) using a keyboard coupled to external USB port 222. Microcontroller 216 may receive the user selection for the first node via a USB (keyboard/mouse) signal 266. Based on the user selection, microcontroller 216 can perform an internal multiplexer selection of the serial connection corresponding to the selected node (e.g., UART node_1). Microcontroller 216 can convert stored text-based serial data from the selected node to first video output. Microcontroller 216 can transmit the first video output as video out 258 to video output MUX 218.

Upon receiving the user selection for the first node via USB signal 266, microcontroller 216 can also transmit the user selection to USB MUX 210 via a USB MUX select signal 264. Upon receiving USB MUX select signal 264, USB MUX 210 can select the USB connection corresponding to the selected node (e.g., USB node_1 232) and transmit the USB data to USB hub 212 via a USB signal 250.

USB hub 212 can receive USB data from USB MUX 210 as well as from microcontroller 216. As described herein, signals 266 and 268 received from external USB ports 222 and 224 can be "passed through" microcontroller 216 and transmitted onwards to USB hub 212 as USB (keyboard/mouse) interface (I/F) signals 270. This can allow USB devices coupled to USB ports 222 and 224 to appear as hot-added to the selected node. USB hub 212 can transmit the received USB signal 250 from USB node_1 232 via a USB (video I/F) 252 to USB video controller 214. USB video controller 214 can transmit the USB signal 250 as video out 254 to video output MUX 218. USB video controller can also send video out 254 as a signal 256 to microcontroller 218.

Microcontroller 218 can use signal 256 to determine whether the selected node is in a pre-boot or a post-boot environment. Microcontroller 216 can listen for signal 256. If microcontroller 216 does not sense signal 256, microcontroller 216 can transmit a video output MUX select signal 260 to video output MUX 218 to select the video out 258 (as previously transmitted to video output MUX 218 by microcontroller 216). If microcontroller 216 does sense signal 256, microcontroller 216 can transmit video output MUX select signal 260 to video output MUX 218 to select the video out 254 (as previously transmitted to video output MUX 218 by USB video controller 214).

Based on video output MUX select signal 260, video output MUX 218 can transmit the final video output as video out 262 to video output port 220. Video out 262 can be displayed on an external screen or monitor coupled to video output port 220. For example, if video out 262 corresponds to video out 258 (as in the case when the pre-boot environment is detected), video out 262 can be displayed as a Basic Input/Output System (BIOS) screen, which may include boot-up and other configuration information, such as depicted below in relation to FIG. 4A. If video out 262 corresponds to video out 254, video out 262 can be displayed as, e.g., the Desktop in a system running Windows.

Figure 3:
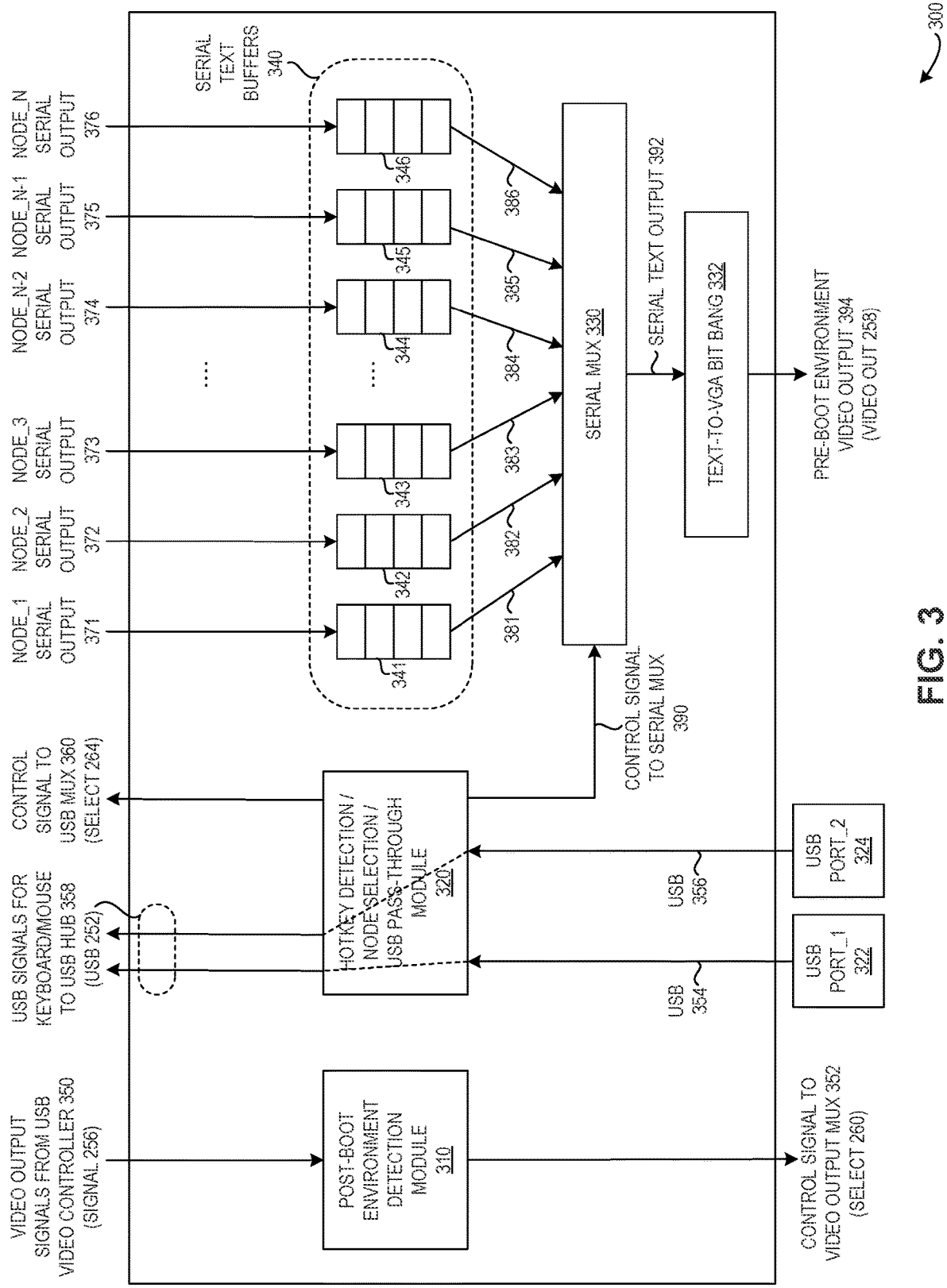
FIG. 3 illustrates a microcontroller in a shared KVM switch corresponding to FIG. 2, in accordance with an aspect of the present application.

Operation of a Microcontroller in a Shared KVM Switch for Headless Blade Servers FIG. 3 illustrates a microcontroller 300 in a shared KVM switch corresponding to FIG. 2, in accordance with an aspect of the present application. Microcontroller 300 can correspond to microcontroller 216 of FIG. 2. Microcontroller 300 can include: a post-boot environment detection module 310; a hot key detection/node selection/USB pass-through module 320; serial text buffers 340; a serial MUX 330; and a text-to-VGA bit bang 332. Microcontroller 300 can also include other modules (not shown) which can detect other environments or states of the nodes coupled to or associated with the KVM switch. Post-boot environment detection module 310 can listen for and detect video output signals from USB video controller 214. Such detected video output signals can be indicated as video output signals from USB video controller 350 (signal 256). Based on whether post-boot environment detection module 310 receives signals 350/256, post-boot environment detection module 310 can send the appropriate control signal to video output MUX 218. This control signal can be indicated as a control signal to video output MUX 352 (select 260).

If post-boot environment detection module 310 does not detect signals 350 (signal 256), post-boot environment detection module 310 can transmit control signal 352 (select 260) to video output MUX 218 to select, e.g., video out 258 as previously transmitted to video output MUX 218 by microcontroller 216. If post-boot environment detection module 310 does detect signals 350 (signal 256), post-boot environment detection module 310 can transmit control signal 352 (select 260) to video output MUX 218 to select, e.g., video out 254 as previously transmitted to video output MUX 218 by USB video controller 214.

Module 320 can perform several functions, including hotkey detection and USB pass-through. Module 320 can receive USB signals 354 and 356 from external USB ports connected to, e.g., a keyboard via an external USB port_1 322 and a mouse via an external USB port_2 324. Module 320 can determine whether USB signals 354 indicate one or more predefined hotkeys. If module 320 determines or detects, based on USB signals 354 or 356, that a predefined hotkey has been pressed, module 320 can pass the USB signals through microcontroller 300 and transmit those signals on to USB hub 212 as USB signals for keyboard/mouse to USB hub 358 (which corresponds to USB (keyboard/mouse interface) signals 252 of FIG. 2). As described above, USB hub 212 can facilitate allowing a selected blade server to recognize the external mouse and keyboard coupled to external USB ports 322 and 324 as hot-added.

Module 320 can also handle node selection. For example, a user can use the keyboard coupled to external USB port 322 (or 324) to select a node to access via a shared KVM switch in which microcontroller 300 resides. Module 320 can determine that the keyboard input (e.g., USB 354 or 356) indicates a user selection of, e.g., a node_1 232. Module 320 can send a control signal to USB MUX 210. This control signal can be indicated as a control signal to USB MUX 360 (select 264).

Module 320 can also send a control signal to internal serial MUX 330 of microcontroller 300. This control signal can be indicated as a control signal to serial MUX 390.

Serial MUX 330 can receive data from serial text buffers 340, where each serial text buffer can correspond to a serial output received from each of the multiple headless blade servers coupled to the KVM switch in which microcontroller 300 resides. For example: a node_1 serial output 371 can be stored in a corresponding serial text buffer 341 and transmitted to serial MUX 330 (via a communication 381); a node_2 serial output 372 can be stored in a corresponding serial text buffer 342 and transmitted to serial MUX 330 (via a communication 382); a node_3 serial output 373 can be stored in a corresponding serial text buffer 343 and transmitted to serial MUX 330 (via a communication 383); a node_N-2 serial output 374 can be stored in a corresponding serial text buffer 344 and transmitted to serial MUX 330 (via a communication 384); a node_N-1 serial output 375 can be stored in a corresponding serial text buffer 345 and transmitted to serial MUX 330 (via a communication 385); and a node_N serial output 376 can be stored in a corresponding serial text buffer 346 and transmitted to serial MUX 330 (via a communication 386). Serial output 371 can correspond to serial data received from UART node_1 242, and serial output 376 can correspond to serial data received from UART node_N 244, as depicted in FIG. 2.

Upon receiving control signal 390 from module 320, internal serial MUX 330 can select the serial text buffer corresponding to the selected node indicated in control signal 390. Serial MUX 330 can transmit serial data from the selected serial text buffer as serial text output 392 to text-to-VGA bit bang module 332. Module 332 can convert received serial text output 392 into video output and transmit the video output to video output MUX 218. This video output can be indicated as pre-boot environment video output 394 (video out 258).

As described above, video output MUX 218 can use the control signal 352 (select 260) to determine whether to select USB video out 254 for the selected node (post-boot environment) or video out 258 for the selected node (pre-boot environment video output 394).

Exemplary Screens During Pre-Boot With and Without Text-Based Serial Port Frame Buffering FIG. 4A illustrates a sample screen 400 displaying contents during a pre-boot environment, as a desired screen output, in accordance with an aspect of the present application. Assume that a label 404 indicates the exact point in the boot process at which a user of the shared KVM switch decides to select or switch over to the node whose pre-boot environment contents are displayed on screen 400. This selected node can be indicated as "Node 3" by an element 402 of screen 400, and the selection can be made by the user pressing a hotkey based on a displayed menu selection (not shown). Because a serial text stream is generally converted to video in real-time, without the text-based serial port frame buffering described herein, the actual screen output would appear as depicted below in FIG. 4B.

FIG. 4B illustrates a sample screen 410 of pre-boot environment contents without text-based serial port frame buffering, corresponding to sample screen 400 of FIG. 4A, in accordance with an aspect of the present application. Sample screen 410 depicts a blank area 412, which indicates that all text output on the serial port prior to the node (i.e., Node 3) being selected does not appear on the screen since the serial text stream cannot go backwards in time.

FIG. 4C illustrates a sample screen 420 displaying contents during a pre-boot environment, as a desired screen output, similar to sample screen 400 of FIG. 4A, in accordance with an aspect of the present application. Again assume that label 404 indicates the exact point in the boot process at which a user of the shared KVM switch decides to select or switch over to "Node 3" (as indicated by element 402 of screen 420). Because the described aspects provide text-based serial port frame buffering (e.g., serial text buffer 343 which stores serial data received from corresponding Node_3 serial output 373 of FIG. 3), the actual screen output would appear as the depicted below in FIG. 4D (similar to the desired screen output of screen 420 of FIG. 4C).

FIG. 4D illustrates a sample screen 430 of pre-boot environment contents with text-based serial port frame buffering, corresponding to sample screen 420 of FIG. 4C, in accordance with an aspect of the present application. Instead of a blank or missing area 412 (as in FIG. 410 of FIG. 4B), screen 430 depicts a desired screen output which includes contents 432 as stored in a serial port frame buffer corresponding to Node 3 (e.g., serial text buffer 343 of FIG. 3). Contents 432 may be stored in and subsequently retrieved from serial text buffer 343. Thus, even though the selection or switchover occurs after time point 404, the serial text buffer can store the text contents of the pre-boot environment for Node 3 prior to the selection or switchover. This allows the system to display the entire contents of the desired screen immediately after the new node (e.g., Node 3) is selected (i.e., switched over by the user via the shared KVM switch).

Method for Facilitating a Shared KVM Switch for Headless Blade Servers

Figure 5A:
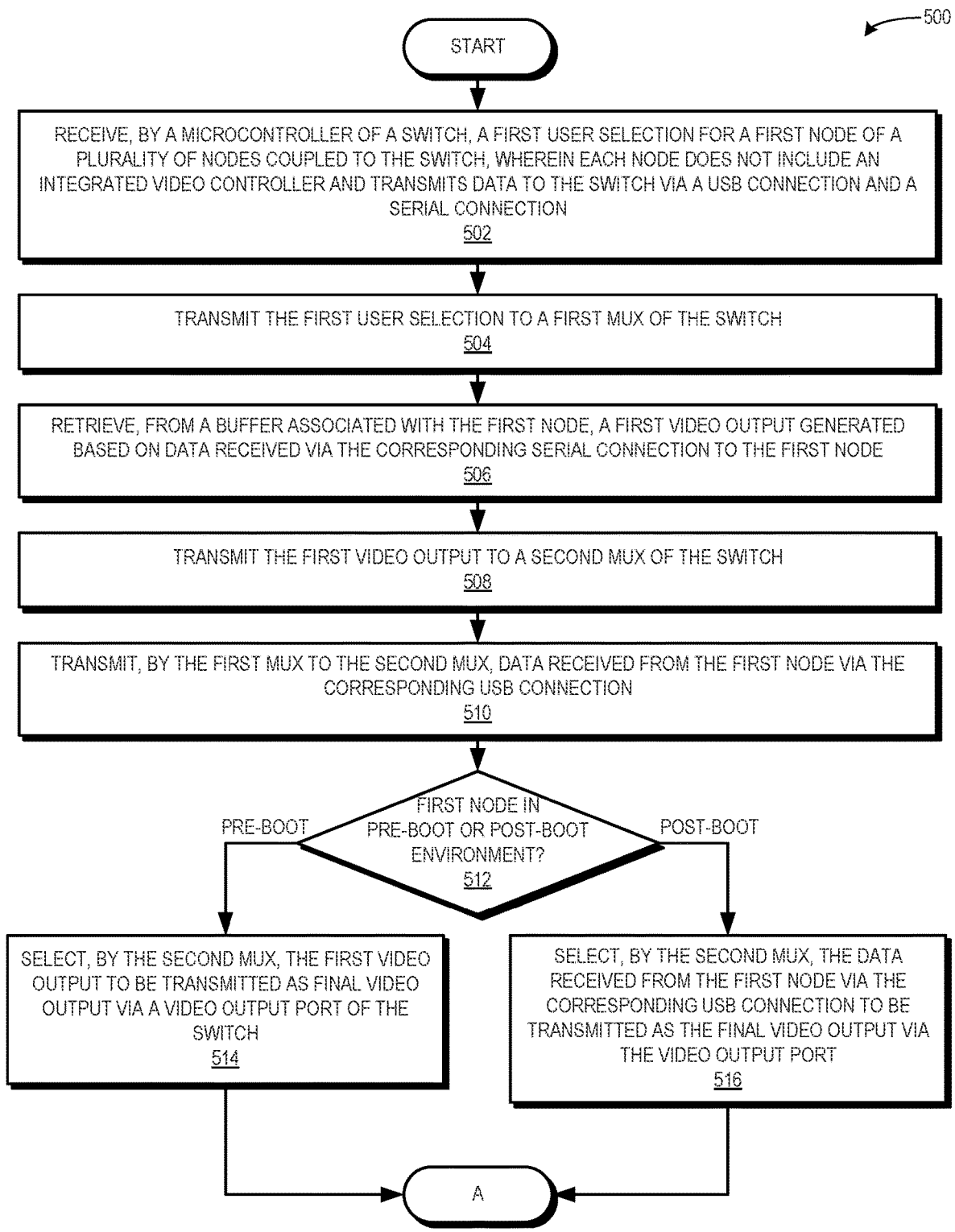
FIG. 5A presents a flowchart illustrating a method which facilitates a system with a shared KVM switch for multiple blade servers without integrated video controllers, in accordance with an aspect of the present application.

FIG. 5A presents a flowchart 500 illustrating a method which facilitates a system with a shared KVM switch for multiple blade servers without integrated video controllers, in accordance with an aspect of the present application. During operation, the system receives, by a microcontroller of a switch, a first user selection for a first node of a plurality of nodes coupled to the switch, wherein each node does not include an integrated video controller and transmits data to the switch via a USB connection and a serial connection (operation 502). The system transmits the first user selection to a first multiplexer of the switch (operation 504). The system can determine a buffer of the microcontroller, wherein the buffer is associated with the first node (not shown). The system (e.g., the microcontroller) retrieves, from the buffer associated with the first node, a first video output generated based on data received via the corresponding serial connection to the first node (operation 506). The system transmits the first video output to a second multiplexer of the switch (operation 508). The first multiplexer transmits to the second multiplexer data received from the first node via the corresponding USB connection (operation 510).

Responsive to the first node being in a pre-boot environment (decision 512), the system selects, by the second multiplexer, the first video output to be transmitted as final video output via a video output port of the switch (operation 514). Responsive to the first node being in a post-boot environment (decision 512), the system selects, by the second multiplexer, the data received from the first node via the corresponding USB connection to be transmitted as the final video output via the video output port (operation 516). While decision 512 is depicted as determining whether the first node is in a pre-boot or a post-boot environment, decision 512 may also detect other environments or states associated with the first node (e.g., a first environment and a second environment). The operation continues at Label B of FIG. 5B.

Figure 5B:
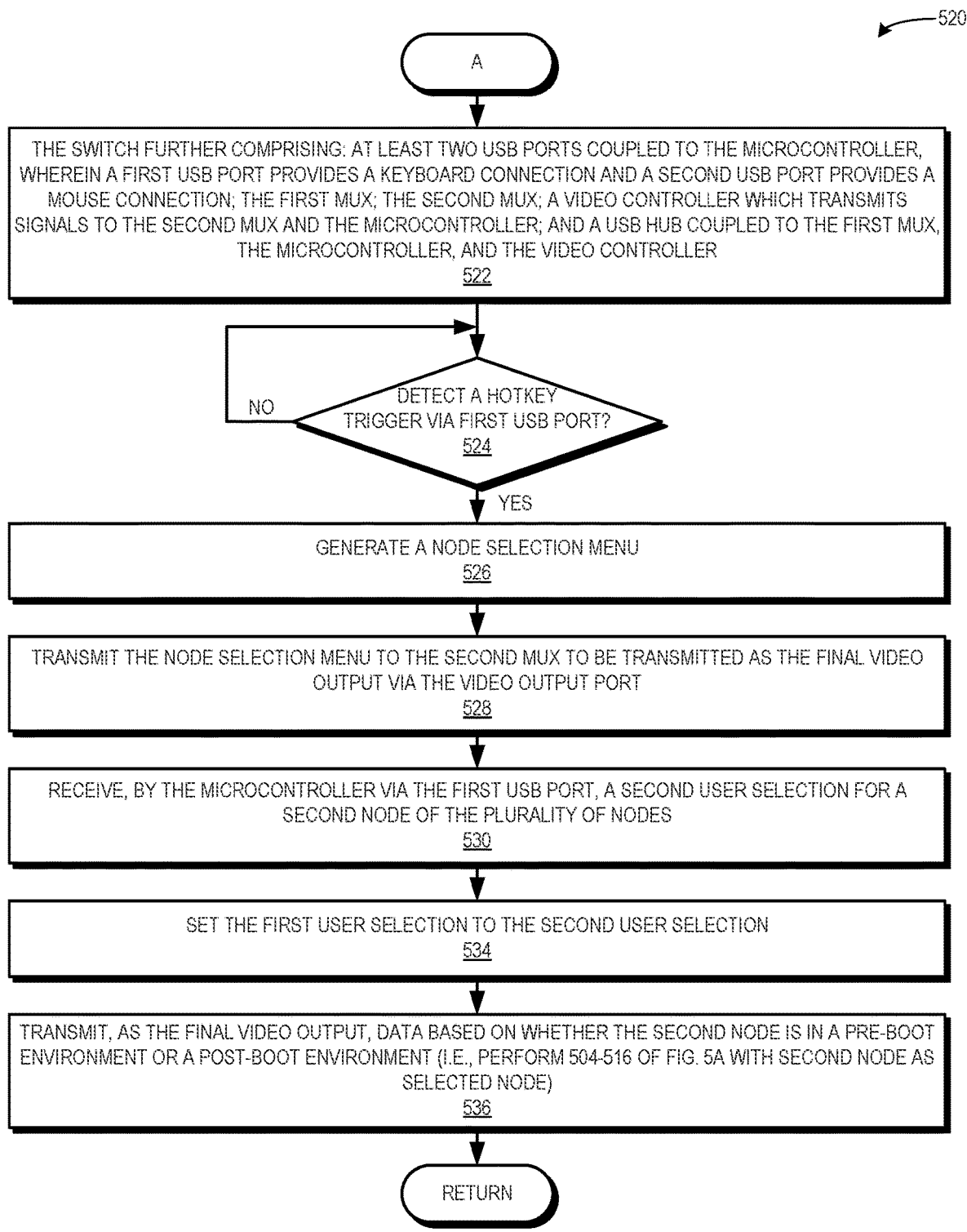
FIG. 5B presents a flowchart illustrating a method which facilitates a system with a shared KVM switch for multiple blade servers without integrated video controllers, including switching between different blade servers, in accordance with an aspect of the present application.

FIG. 5B presents a flowchart 520 illustrating a method which facilitates a system with a shared KVM switch for multiple blade servers without integrated video controllers, including switching between different blade servers, in accordance with an aspect of the present application. The switch further comprises: at least two USB ports coupled to the microcontroller, wherein a first USB port provides a keyboard connection and a second USB port provides a mouse connection; the first multiplexer; the second multiplexer; a video controller which transmits signals to the second multiplexer and the microcontroller; and a USB hub coupled to the first multiplexer, the microcontroller, and the video controller (operation 522). If the system does not detect a hotkey trigger via a first USB port, the system can wait until it detects one (decision 524).

If the system detects signals which are not the hotkey trigger from the first and second USB ports, the system passes the detected signals to the USB hub (not shown). If the system detects a hotkey trigger via the first USB port (decision 524), the system generates a node selection menu (operation 526). The system transmits the node selection menu to the second multiplexer to be transmitted as the final video output via the video output port (operation 528). For example, the video output MUX can select the video output of the microcontroller (as in select signal 260 and video out 258 of FIG. 2).

The system receives, by the microcontroller via the first USB port, a second user selection for a second node of the plurality of nodes (operation 530). The system sets the first user selection to the second user selection (operation 534). For example, the microcontroller can set the USB MUX to connect the USB hub to the selected node's USB port (as in select signal 264 of FIG. 2). The system can transmit, as the final video output, data based on whether the second node is in a pre-boot environment or a post-boot environment (operation 536) and the operation returns. Operation 536 can correspond to returning to operation 504 of FIG. 5A and performing operations 504-516 with the second node as the selected node. As described above, while operation 536 is depicted as transmitting data based on whether the second node is in a pre-boot or a post-boot environment, operation 536 may also be based on other environments or states associated with the second node (e.g., a first environment and a second environment).

Apparatus for a Shared KVM Switch for Headless Blade Servers

Figure 6:
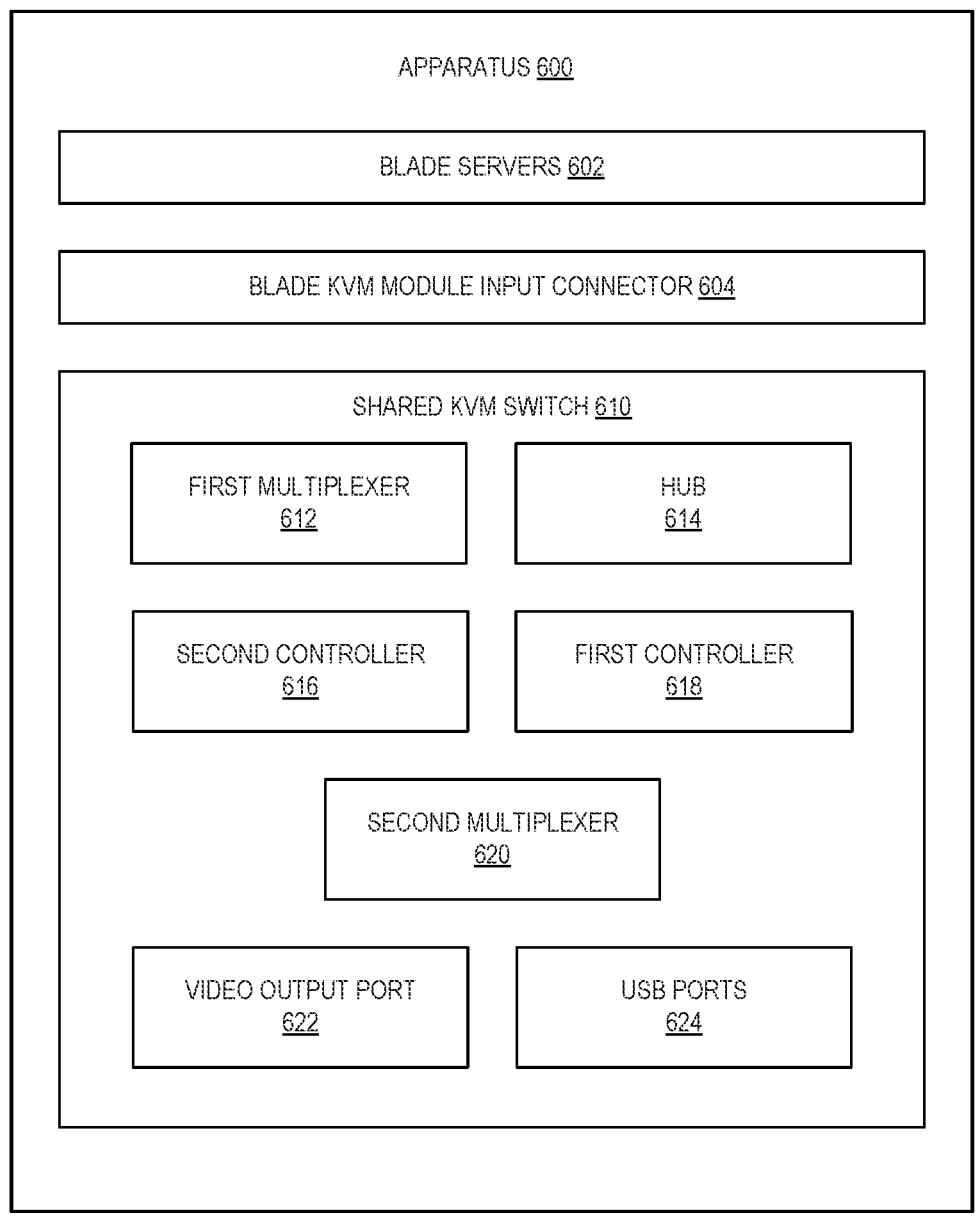
FIG. 6 illustrates an apparatus which facilitates a shared KVM switch for multiple blade servers without integrated video controllers, in accordance with an aspect of the present application.

FIG. 6 illustrates an apparatus 600 which facilitates a shared KVM switch for multiple blade servers without integrated video controllers, in accordance with an aspect of the present application. Apparatus 600 can include blade servers 602; a blade KVM module input connector 604; and a shared KVM switch 610. Shared KVM switch 610 can include: a first multiplexer 612 (e.g., a USB MUX); a hub 614 (e.g., a USB hub); a first controller 618 (e.g., a microcontroller); a second controller 616 (e.g., a video controller); a second multiplexer 620 (e.g., a video controller MUX); a video output port 622; and USB ports 624. The elements, components, entities, or units described as part of apparatus 600 may perform the same operations as described above in relation to FIGS. 1, 2, 3, 5A, and 5B.

In general, the disclosed aspects provide a method and apparatus for facilitating a shared KVM switch which provide video functionality to multiple headless servers without integrated video controllers. In one aspect of the present application, an apparatus comprises: a switch; and a plurality of servers coupled to the switch. Each server transmits data to the switch via a USB connection and a serial connection. The switch comprises a video output port and a first controller comprising buffers which store video output generated based on data received via serial connections from the servers. The first controller: receives a first user selection for a first server; transmits the first user selection to a first multiplexer; retrieves, based on a buffer associated with the first server, a first video output generated based on data received via the corresponding serial connection to the first server; and transmits the first video output to a second multiplexer. The first multiplexer transmits data received from the first server via the corresponding USB connection to the second multiplexer. Responsive to the first server being in a first environment, the second multiplexer selects the first video output to be transmitted as final video output via the video output port. Responsive to the first server being in a second environment, the second multiplexer selects the data received from the first server via the corresponding USB connection to be transmitted as the final video output via the video output port.

In a variation on this aspect, the switch further comprises: at least two USB ports coupled to the first controller, wherein a first USB port provides a keyboard connection and a second USB port provides a mouse connection; the first multiplexer; the second multiplexer; a second controller which transmits signals to the second multiplexer and the first controller; and a USB hub coupled to the first multiplexer, the first controller, and the second controller.

In another variation, the first multiplexer transmits the data received from the first server via the corresponding USB connection to the second multiplexer via the USB hub and the second controller.

In a further variation, the first controller receives the first user selection for the first server via the USB ports.

In a further variation, the first environment comprises a pre-boot environment, and the first controller determines that the first server is in the pre-boot environment by detecting no signal from the second controller. The second environment comprises a post-boot environment, and the first controller determines that the first server is in the post-boot environment by detecting a signal from the second controller.

In a further variation, responsive to detecting a hotkey trigger via the first USB port, the first controller generates a node selection menu and transmits the node selection menu to the second multiplexer to be transmitted as the final video output via the video output port.

In a further variation, the first controller: receives a second user selection for a second server via the first USB port; transmits the second user selection to the first multiplexer; retrieves, based on a buffer associated with the second server, a second video output generated based on data received via the corresponding serial connection to the second server; and transmits the second video output to the second multiplexer. The first multiplexer transmits data received from the second server via the corresponding USB connection to the second multiplexer. Responsive to the second server being in the first environment, the second multiplexer selects the second video output to be transmitted as the final video output via the video output port. Responsive to the second server being in the second environment, the second multiplexer selects the data received from the second server via the corresponding USB connection to be transmitted as the final video output via the video output port.

In a further variation, responsive to detecting signals which are not the hotkey trigger from the at least two USB ports, the first controller passes the detected signals to the USB hub.

In a further variation, prior to retrieving the first video output from the buffer associated with the first server, the first controller transmits the first user selection to a third multiplexer residing in the first controller. The third multiplexer transmits the first video output as serial text output to a bit bang module prior to the first controller transmitting the first video output to the second multiplexer.

In a further variation, the switch resides in at least one of: a same chassis or enclosure as the plurality of servers; and a different chassis or enclosure from the plurality of servers.

In another aspect of the present application, a system receives, by a microcontroller of a switch, a user selection for a first node of a plurality of nodes coupled to the switch, wherein each node does not include an integrated video controller and transmits data to the switch via a USB connection and a serial connection. The system transmits the user selection to a first multiplexer of the switch. The system retrieves, based on a buffer associated with the first node, a first video output generated based on data received via the corresponding serial connection to the first node. The system transmits the first video output to a second multiplexer of the switch. The first multiplexer transmits data received from the first node via the corresponding USB connection to the second multiplexer. Responsive to the first node being in a pre-boot environment, the system transmits to the second multiplexer a first selection for the first video output, which is to be transmitted as final video output via a video output port of the switch. Responsive to the first node being in a post-boot environment, the system transmits to the second multiplexer a second selection for the data received from the first node via the corresponding USB connection, which is to be transmitted as the final video output via the video output port.

In yet another aspect of the present application, a non-transitory computer-readable storage medium stores instructions that when executed by a computer cause the computer to perform a method. The method comprises: receiving, by a microcontroller of a switch, a user selection for a first node of a plurality of nodes coupled to the switch, wherein each node does not include an integrated video controller and transmits data to the switch via a USB connection and a serial connection; transmitting the user selection to a first multiplexer of the switch; retrieving, based on a buffer associated with the first node, a first video output generated based on data received via the corresponding serial connection to the first node; transmitting the first video output to a second multiplexer of the switch. The first multiplexer transmits data received from the first node via the corresponding USB connection to the second multiplexer via a USB hub and a second controller. The method further comprises: responsive to the microcontroller detecting no signal from the second controller, selecting, by the second multiplexer, the first video output for transmission as final video output of the switch; and responsive to the microcontroller detecting a signal from the second controller, selecting, by the second multiplexer, the data received from the first node via the corresponding USB connection for transmission as the final video output.

In a variation on this aspect, the switch further comprises a first and a second USB port coupled to the microcontroller. The first USB port provides a keyboard connection and the second USB port provides a mouse connection. The method further comprises: responsive to detecting a hotkey trigger via the first USB port, generating a node selection menu; transmitting the node selection menu to the second multiplexer to be transmitted as the final video output; receiving a second user selection for a second node via the first USB port; setting the first user selection to the second user selection; and transmitting, as the final video output, data based on whether the second node is in a pre-boot environment or a post-boot environment The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. An apparatus comprising:
   a switch; and
   a plurality of servers coupled to the switch, wherein each server transmits data to the switch via a USB connection and a serial connection;
   wherein the switch comprises a video output port and a first controller comprising buffers which store video output generated based on data received via serial connections from the servers,
   wherein the first controller:
      receives a first user selection for a first server;
      transmits the first user selection to a first multiplexer;
      retrieves, based on a buffer associated with the first server, a first video output generated based on data received via the corresponding serial connection to the first server; and
      transmits the first video output to a second multiplexer,
   wherein the first multiplexer transmits data received from the first server via the corresponding USB connection to the second multiplexer,
   wherein responsive to the first server being in a first environment, the second multiplexer selects the first video output to be transmitted as final video output via the video output port, and
   wherein responsive to the first server being in a second environment, the second multiplexer selects the data received from the first server via the corresponding USB connection to be transmitted as the final video output via the video output port.

2. The apparatus of claim 1, wherein the switch further comprises:
   at least two USB ports coupled to the first controller, wherein a first USB port provides a keyboard connection and a second USB port provides a mouse connection;
   the first multiplexer;
   the second multiplexer;
   a second controller which transmits signals to the second multiplexer and the first controller; and
   a USB hub coupled to the first multiplexer, the first controller, and the second controller.

3. The apparatus of claim 2, wherein the first multiplexer transmits the data received from the first server via the corresponding USB connection to the second multiplexer via the USB hub and the second controller.

4. The apparatus of claim 2, wherein the first controller receives the first user selection for the first server via the USB ports.

5. The apparatus of claim 2, wherein the first environment comprises a pre-boot environment, and wherein the first controller determines that the first server is in the pre-boot environment by detecting no signal from the second controller, and wherein the second environment comprises a post-boot environment, and wherein the first controller determines that the first server is in the post-boot environment by detecting a signal from the second controller.

6. The apparatus of claim 2, wherein the first controller further:
   responsive to detecting a hotkey trigger via the first USB port, generates a node selection menu; and
   transmits the node selection menu to the second multiplexer to be transmitted as the final video output via the video output port.

7. The apparatus of claim 6, wherein the first controller further:
   receives, via the first USB port, a second user selection for a second server of the plurality of servers;
   transmits the second user selection to the first multiplexer;
   retrieves, based on a buffer associated with the second server, a second video output generated based on data received via the corresponding serial connection to the second server; and
   transmits the second video output to the second multiplexer;
   wherein the first multiplexer transmits data received from the second server via the corresponding USB connection to the second multiplexer,
   wherein responsive to the second server being in the first environment, the second multiplexer selects the second video output to be transmitted as the final video output via the video output port, and
   wherein responsive to the second server being in the second environment, the second multiplexer selects the data received from the second server via the corresponding USB connection to be transmitted as the final video output via the video output port.

8. The apparatus of claim 6, wherein the first controller further:
   responsive to detecting signals which are not the hotkey trigger from the at least two USB ports, passes the detected signals to the USB hub.

9. The apparatus of claim 1, wherein prior to retrieving the first video output from the buffer associated with the first server, the first controller further:
   transmits the first user selection to a third multiplexer residing in the first controller, wherein the third multiplexer transmits the first video output as serial text output to a bit bang module prior to the first controller transmitting the first video output to the second multiplexer.

10. The apparatus of claim 1, wherein the switch resides in at least one of:
a same chassis or enclosure as the plurality of servers; and
a different chassis or enclosure from the plurality of servers.

11. A computer-implemented method, comprising:
receiving, by a microcontroller of a switch, a first user selection for a first node of a plurality of nodes coupled to the switch, wherein each node transmits data to the switch via a USB connection and a serial connection;
transmitting the first user selection to a first multiplexer of the switch;
retrieving, based on a buffer associated with the first node, a first video output generated based on data received via the corresponding serial connection to the first node;
transmitting the first video output to a second multiplexer of the switch,
wherein the first multiplexer transmits data received from the first node via the corresponding USB connection to the second multiplexer;
responsive to the first node being in a first environment, transmitting to the second multiplexer a first selection for the first video output, which is to be transmitted as final video output via a video output port of the switch;
responsive to the first node being in a second environment, transmitting to the second multiplexer a second selection for the data received from the first node via the corresponding USB connection, which is to be transmitted as the final video output via the video output port.

12. The method of claim 11, wherein the switch further comprises:
at least two USB ports coupled to the microcontroller, wherein a first USB port provides a keyboard connection and a second USB port provides a mouse connection;
the first multiplexer;
the second multiplexer;
a video controller which transmits signals to the second multiplexer and the microcontroller; and
a USB hub coupled to the first multiplexer, the microcontroller, and the video controller.

13. The method of claim 12,
wherein the first multiplexer transmits the data received from the first node via the corresponding USB connection to the second multiplexer via the USB hub and the video controller, and
wherein the microcontroller receives the first user selection for the first node via the USB ports.

14. The method of claim 12, wherein the first environment comprises a pre-boot environment and the second environment comprises a post-boot environment, wherein the method further comprises:
determining, by the microcontroller, that the first node is in the pre-boot environment by detecting no signal from the video controller, and
determining, by the microcontroller, that the first node is in the post-boot environment by detecting a signal from the video controller.

15. The method of claim 12, further comprising:
responsive to the microcontroller detecting a hotkey trigger via the first USB port:
generating a node selection menu; and
transmitting the node selection menu to the second multiplexer to be transmitted as the final video output via the video output port.

16. The method of claim 15, further comprising:
receiving, by the microcontroller by the first USB port, a second user selection for a second node of the plurality of nodes;
transmitting the second user selection to the first multiplexer;
retrieving, based on a buffer associated with the second node, a second video output generated based on data received via the corresponding serial connection to the second node; and
transmitting the second video output to the second multiplexer;
wherein the first multiplexer transmits data received from the second node via the corresponding USB connection to the second multiplexer;
responsive to the second node being in the first environment, selecting, by the second multiplexer, the second video output to be transmitted as the final video output via the video output port; and
responsive to the second node being in the second environment, selecting, by the second multiplexer, the data received from the second node via the corresponding USB connection to be transmitted as the final video output via the video output port.

17. The method of claim 15, further comprising:
responsive to detecting signals which are not the hotkey trigger from the at least two USB ports, passing the detected signals to the USB hub.

18. The method of claim 11, wherein prior to retrieving the first video output from the buffer associated with the first node, the method further comprises:
transmitting the first user selection to a third multiplexer residing in the first controller,
wherein the third multiplexer transmits the first video output as serial text output to a bit bang module prior to the microcontroller transmitting the first video output to the second multiplexer.

19. A non-transitory computer-readable storage medium storing instructions that when executed by a computer cause the computer to perform a method, the method comprising:
receiving, by a microcontroller of a switch, a first user selection for a first node of a plurality of nodes coupled to the switch, wherein each node transmits data to the switch via a USB connection and a serial connection;
transmitting the first user selection to a first multiplexer of the switch;
retrieving, based on a buffer associated with the first node, a first video output generated based on data received via the corresponding serial connection to the first node;
transmitting the first video output to a second multiplexer of the switch,
wherein the first multiplexer transmits data received from the first node via the corresponding USB connection to the second multiplexer via a USB hub and a second controller;
responsive to the microcontroller detecting no signal from the second controller, selecting, by the second multiplexer, the first video output for transmission as final video output of the switch; and
responsive to the microcontroller detecting a signal from the second controller, selecting, by the second multiplexer, the data received from the first node via the corresponding USB connection for transmission as the final video output.

20. The storage medium of claim 19,
wherein the switch further comprises a first and a second USB port coupled to the microcontroller, wherein the first USB port provides a keyboard connection and the second USB port provides a mouse connection, and
wherein the method further comprises:
   responsive to detecting a hotkey trigger via the first USB port, generating a node selection menu;
   transmitting the node selection menu to the second multiplexer to be transmitted as the final video output;
   receiving, via the first USB port, a second user selection for a second node of the plurality of nodes;
   setting the first user selection to the second user selection; and
   transmitting, as the final video output, data based on whether the second node is in a pre-boot environment or a post-boot environment.

\* \* \* \* \*